(12) United States Patent
Murphy et al.

(10) Patent No.: US 7,954,426 B2
(45) Date of Patent: Jun. 7, 2011

(54) COMPACTOR SYSTEMS AND METHODS FOR COMPACTING A MASS

(75) Inventors: Michael T. Murphy, Oak Island, NC (US); Gary Ray Hendricks, Jacksonville, NC (US)

(73) Assignee: Container Products Corporation, Wilmington, NC (US)

( * ) Notice: Subject to any disclaimer, the term of this patent is extended or adjusted under 35 U.S.C. 154(b) by 295 days.

(21) Appl. No.: 12/128,832

(22) Filed: May 29, 2008

(65) Prior Publication Data

US 2009/0293742 A1    Dec. 3, 2009

(51) Int. Cl.
*B30B 9/06* (2006.01)
(52) U.S. Cl. ........... 100/110; 100/73; 100/104; 100/295
(58) Field of Classification Search .................. 100/104, 100/110, 125, 126, 127, 295, 73
See application file for complete search history.

(56) References Cited

U.S. PATENT DOCUMENTS

| | | | | |
|---|---|---|---|---|
| 5,630,362 A | * | 5/1997 | Jonsson | 100/52 |
| 5,774,816 A | * | 6/1998 | Fontenot et al. | 588/1 |
| 5,996,485 A | * | 12/1999 | Suter et al. | 100/37 |
| 6,247,397 B1 | * | 6/2001 | Diotalevi | 100/71 |

* cited by examiner

*Primary Examiner* — Jimmy T Nguyen
(74) *Attorney, Agent, or Firm* — Myers Bigel Sibley & Sajovec, PA (57) ABSTRACT

A compactor system for compressing a mass including liquid and solids includes: a pressure vessel defining a pressure chamber to hold the mass; a compaction mechanism to compress the mass in the pressure chamber to remove the liquid from the solids; a drain port communicating with the pressure chamber and through which the removed liquid drains out of the pressure chamber; drain piping fluidly connected to the drain port to direct the removed liquid to a collection site; and an influent system configured to inject an influent fluid into the pressure chamber through the drain port.

26 Claims, 11 Drawing Sheets

FIG. 14

COMPACTOR SYSTEMS AND METHODS FOR COMPACTING A MASS

FIELD OF THE INVENTION

The present invention relates to methods and apparatus for compacting and, more particularly, methods and apparatus for compacting a mass to remove liquid therefrom.

BACKGROUND OF THE INVENTION

It is desirable to remove liquid from masses of the various types to prepare the mass for further processing. For example, there are many alternative energy applications for compacted, dewatered biomass including conversion to combustion feed, biodiesel, ethanol and others. Additionally, there are many potential applications for compacted biomass in fields other than alternative energy.

There are numerous known methods and systems for dewatering biomass. Most such methods use thermal or mechanical processing. The mechanical methods typically include relatively low pressure compacting mechanisms, such as screw presses and roller presses. The low pressures of these processes limit their dewatering capability. The use of thermal methods is relatively expensive.

In known methods and devices for compacting a mass such as a biomass, the permissible compaction force may be limited by the requirement to contain solids of the mass in the compaction apparatus. For example, there may be a tendency for the solids to extrude into a filter or the like under compaction. Such extrusion may clog the filter, requiring time consuming maintenance.

SUMMARY OF THE INVENTION

According to embodiments of the present invention, a compactor system for compressing a mass including liquid and solids includes: a pressure vessel defining a pressure chamber to hold the mass; a compaction mechanism to compress the mass in the pressure chamber to remove the liquid from the solids; a drain port communicating with the pressure chamber and through which the removed liquid drains out of the pressure chamber; drain piping fluidly connected to the drain port to direct the removed liquid to a collection site; and an influent system configured to inject an influent fluid into the pressure chamber through the drain port.

In some embodiments, the influent fluid is a cleaning liquid.

In some embodiments, the influent fluid is a displacement fluid and the influent system is configured to inject a pressurized flow of the displacement fluid into the pressure chamber through the drain port. The displacement fluid may be pressurized air. According to some embodiments, the influent system is configured to selectively inject a second influent fluid into the pressure chamber through the drain port, wherein the second influent fluid is a cleaning liquid.

According to some embodiments, the influent system is connected to the drain port by the drain piping, and further includes at least one valve mechanism to enable a user to control injection of the influent fluid through the drain port.

According to some embodiments, the compactor system includes a platen disposed in the pressure chamber having platen holes defined therein, wherein the compactor is configured such that the removed liquid drains through the platen holes before draining through the drain port, and the influent fluid flows through the platen holes after flowing through the drain port. The platen may include a filtration system including: an inner platen member contiguous with the pressure chamber to engage the mass during compaction, the inner platen member having a plurality of inner drain holes defined therein; an outer platen member opposite the inner platen member from the pressure chamber, the outer platen member having a plurality of outer drain holes defined therein; and a filter member interposed between the inner platen member and the outer platen member; wherein the inner platen member, the outer platen member and the filter member maintain a high pressure boundary with respect to the compressed mass while permitting the liquid removed from the mass to drain through the inner drain holes, the outer drain holes and the filter member. In some embodiments, the platen defines a sump between the platen and the drain port to temporarily receive the removed liquid before the removed liquid flows out through the drain port.

According to some embodiments, the compaction mechanism includes a self-sealing, movable platen assembly. The platen assembly includes an inner platen member contiguous with the pressure chamber to engage the mass during compaction, an outer platen member opposite the inner platen member from the pressure chamber, and a seal member interposed between the inner platen member and the outer platen member. The seal member extends radially outwardly beyond the inner and outer platen members to form a translatable fluid barrier seal between the movable platen assembly and the pressure vessel.

According to method embodiments of the present invention, a method for compressing a mass including liquid and solids includes: placing the mass in a pressure chamber of a pressure vessel; using a compaction mechanism, compressing the mass in the pressure chamber to remove the liquid from the solids; draining the removed liquid from the pressure chamber through a drain port communicating with the pressure chamber; and injecting an influent fluid into the pressure chamber through the drain port.

According to embodiments of the present invention, a compactor system for compressing a mass including liquid and solids includes: a pressure vessel defining a pressure chamber to hold the mass; a compaction mechanism to compress the mass in the pressure chamber to remove the liquid from the solids; and a filtration system. The filtration system includes: an inner platen member contiguous with the pressure chamber to engage the mass during compaction, the inner platen member having a plurality of inner drain holes defined therein; an outer platen member opposite the inner platen member from the pressure chamber, the outer platen member having a plurality of outer drain holes defined therein; and a filter member interposed between the inner platen member and the outer platen member. The inner platen member, the outer platen member and the filter member maintain a high pressure boundary with respect to the compressed mass while permitting the liquid removed from the mass to drain through the inner drain holes, the outer drain holes and the filter member.

According to some embodiments, at least one of the inner and outer platen members is removable to permit removal and replacement of the filter member. The inner platen member may be removable to permit removal and replacement of the filter member. In some embodiments, the outer platen member is fixed with respect to the pressure vessel. In some embodiments, the compactor system includes a plurality of selectively interchangeable inner platen members each having different patterns of drain holes.

According to some embodiments, the outer platen member defines a sump opposite the filter member to receive the removed liquid.

According to further method embodiments of the present invention, a method for compressing a mass including liquid and solids includes: placing the mass in a pressure chamber of a pressure vessel; using a compaction mechanism, compressing the mass in the pressure chamber to remove the liquid from the solids; and draining the removed liquid through a filtration system. The filtration system includes: an inner platen member contiguous with the pressure chamber to engage the mass during compaction, the inner platen member having a plurality of inner drain holes defined therein; an outer platen member opposite the inner platen member from the pressure chamber, the outer platen member having a plurality of outer drain holes defined therein; and a filter member interposed between the inner platen member and the outer platen member. The inner platen member, the outer platen member and the filter member maintain a high pressure boundary with respect to the compressed mass while permitting the liquid removed from the mass to drain through the inner drain holes, the outer drain holes and the filter member.

According to embodiments of the present invention, a compactor system for compressing a mass including liquid and solids includes: a pressure vessel defining a pressure chamber to hold the mass; a compaction mechanism to compress the mass in the pressure chamber to remove the liquid from the solids and form the remaining solids into a cake; and an ejection system configured to inject a pressurized flow of a displacement fluid into the pressure chamber to forcibly displace the cake with respect to the pressure vessel.

According to method embodiments of the present invention, a method for compressing a mass including liquid and solids includes: placing the mass in a pressure chamber of a pressure vessel; using a compaction mechanism, compressing the mass in the pressure chamber to remove the liquid from the solids and form the remaining solids into a cake; and, using an ejection system, injecting a pressurized flow of a displacement fluid into the pressure chamber to forcibly displace the cake with respect to the pressure vessel.

According to embodiments of the present invention, a compactor system for compressing a mass including liquid and solids includes: a pressure vessel defining a pressure chamber to hold the mass; and a compaction mechanism to compress the mass in the pressure chamber to remove the liquid from the solids. The compaction mechanism includes a self-sealing, movable platen assembly. The platen assembly includes an inner platen member contiguous with the pressure chamber to engage the mass during compaction, an outer platen member opposite the inner platen member from the pressure chamber, and a seal member interposed between the inner platen member and the outer platen member. The seal member extends radially outwardly beyond the inner and outer platen members to form a translatable fluid barrier seal between the movable platen assembly and the pressure vessel.

In some embodiments, the movable platen assembly is configured to permit relative convergent displacement between the inner and outer platen members to apply a compressive load to the seal member, responsive to which the seal member exerts an increased radial outward sealing force against the pressure vessel.

According to method embodiments of the present invention, a method for compressing a mass including liquid and solids includes: placing the mass in a pressure chamber of a pressure vessel; and, using a compaction mechanism, compressing the mass in the pressure chamber to remove the liquid from the solids, including applying a compaction load to the mass using a self-sealing, movable platen assembly. The movable platen assembly includes an inner platen member contiguous with the pressure chamber to engage the mass during compaction, an outer platen member opposite the inner platen member from the pressure chamber, and a seal member interposed between the inner platen member and the outer platen member. The seal member extends radially outwardly beyond the inner and outer platen members to form a translatable fluid barrier seal between the movable platen assembly and the pressure vessel.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIGS. 1-14, a compactor system 10 according to embodiments of the present invention for compacting an exemplary mass M is shown therein. The mass M includes intermingled solid (e.g., solid particles and/or fibers) and liquid (e.g., water and/or other liquids) components. According to some embodiments, the mass is a biomass; however, other types of mass are contemplated. The compactor system 10 can be used to volumetrically compress the mass M to drive the liquid L from the solids of the mass M such that a compacted cake C remains. The compactor system 10 may also include mechanisms to remove the cake C (using a flow of displacement fluid A) and/or to clean a chamber in which the mass M is compacted (using a cleaning fluid B).

The compactor system 10 may apply sufficient compacting force to remove substantially all loose liquid and interstitial liquid and at least some of the bound liquid from the mass M. The cake C formed by the compactor system 10 may be of relatively higher and more uniform density than is commonly achieved by prior art apparatus, such attributes being beneficial for many post-processing applications.

As discussed in more detail herein, the compactor system 10 addresses two criteria that may be necessary for effective commercial use. First, the compactor system 10 may effectively contain the mass M during the dewatering/compaction process while nonetheless allowing the water/liquid to be removed and collected (i.e., the compactor system 10 can maintain a compaction chamber pressure boundary). Second, according to some embodiments, the compactor system 10 includes a mechanism to remove the cake C while preserving the structural integrity of the cake C.

Figure 1:
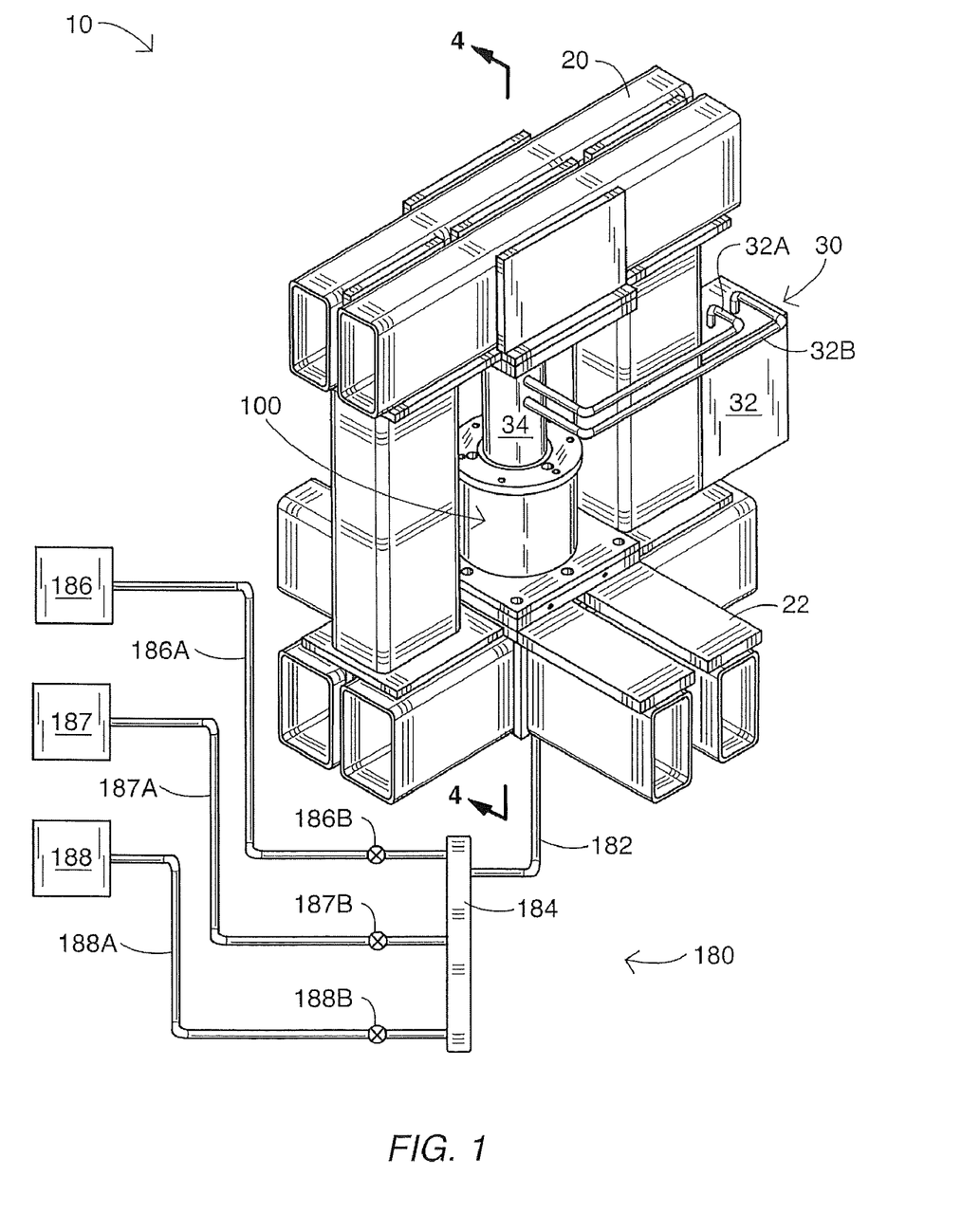
FIG. 1 is a perspective, partially schematic view of a compactor system according to embodiments of the present invention, wherein a press assembly thereof is in a compacting position.
Figure 2:
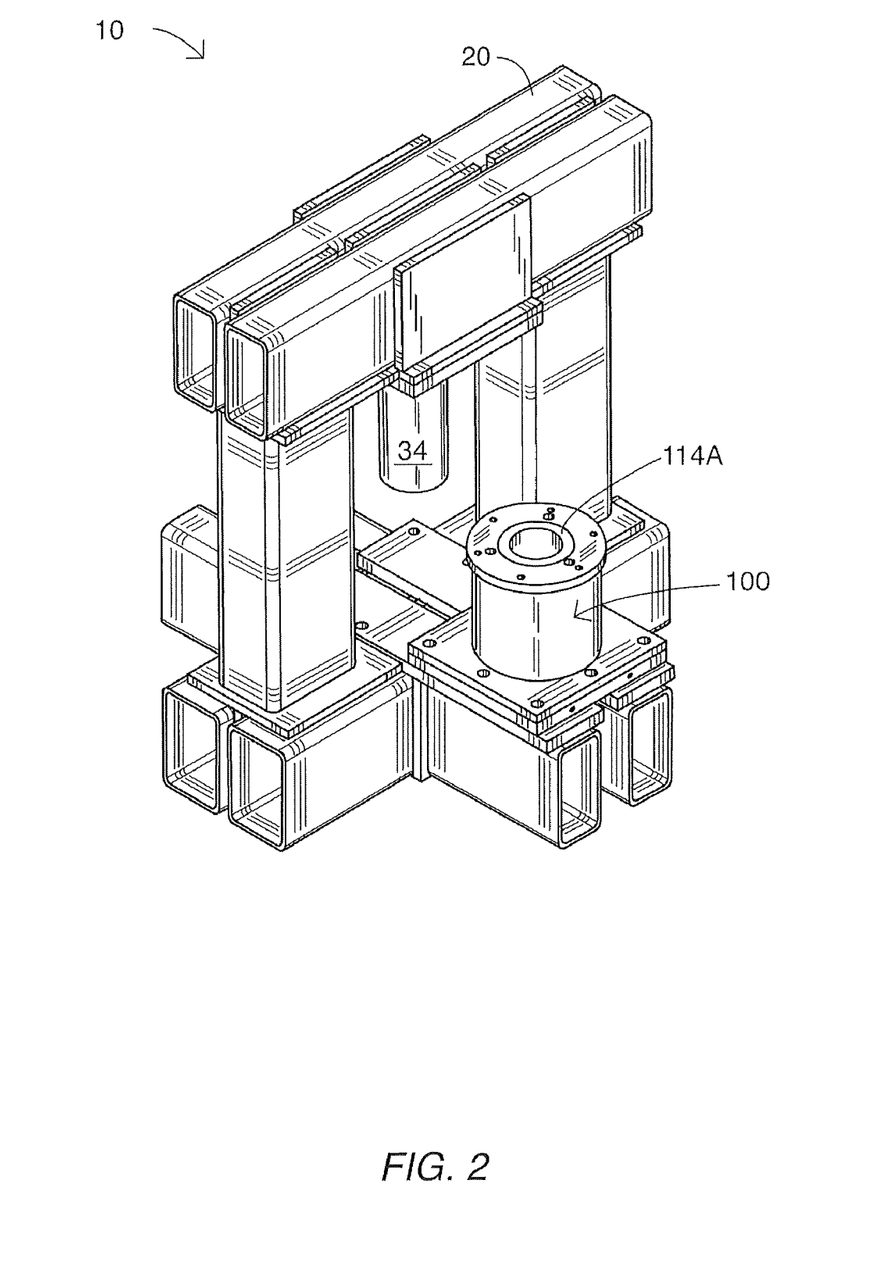
FIG. 2 is a perspective view of the compactor system of FIG. 1 wherein the press assembly is a loading/unloading position.
Figure 3:
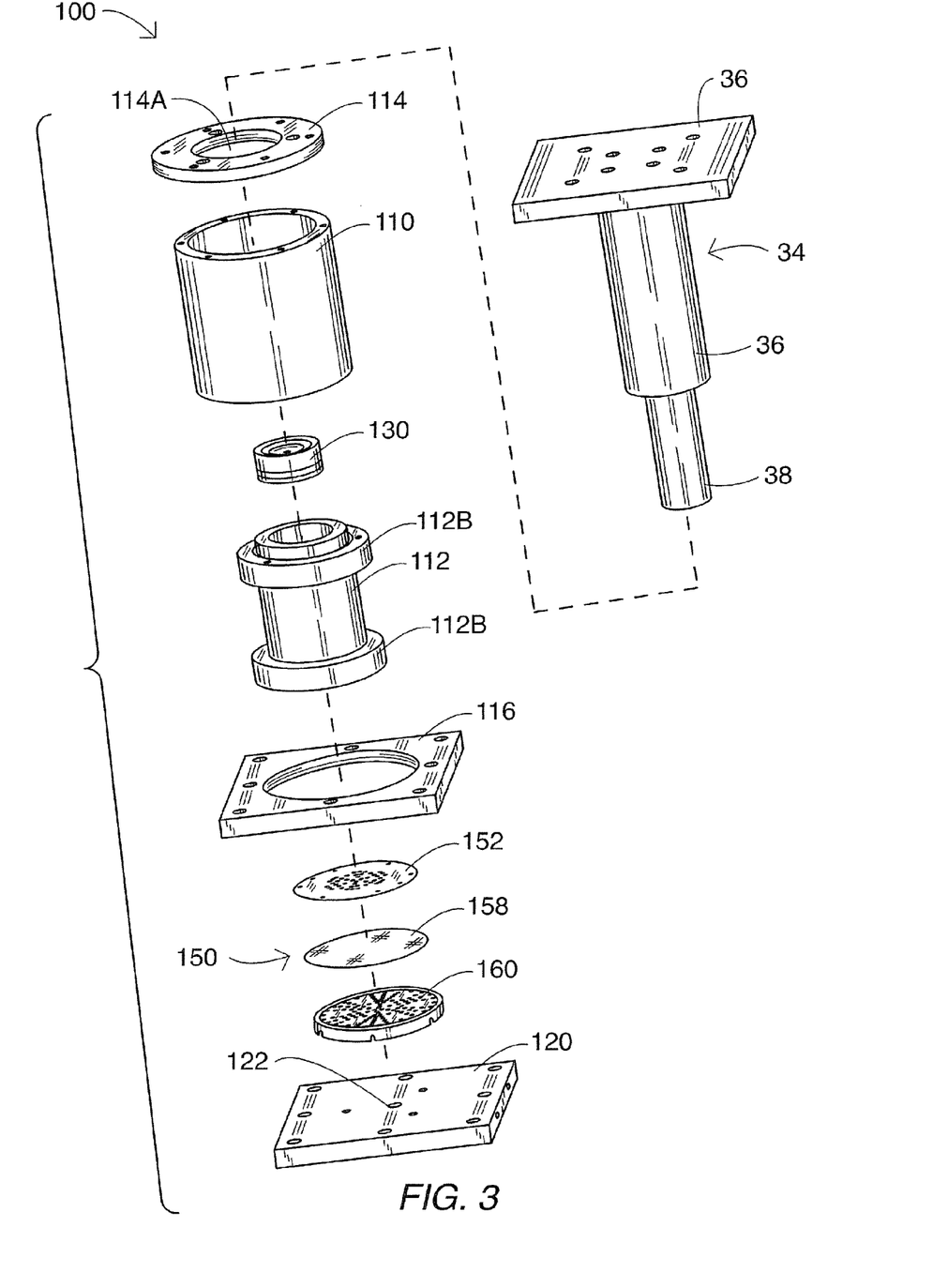
FIG. 3 is an exploded perspective view of the press assembly and a hydraulic cylinder assembly of the compactor system of FIG. 1.

With reference to FIGS. 1-3, the compactor system 10 includes generally a frame 20, a hydraulic drive system 30, a press assembly 100, and a fluid management system 180. Each of these components will be discussed in more detail hereinafter.

Figure 4:
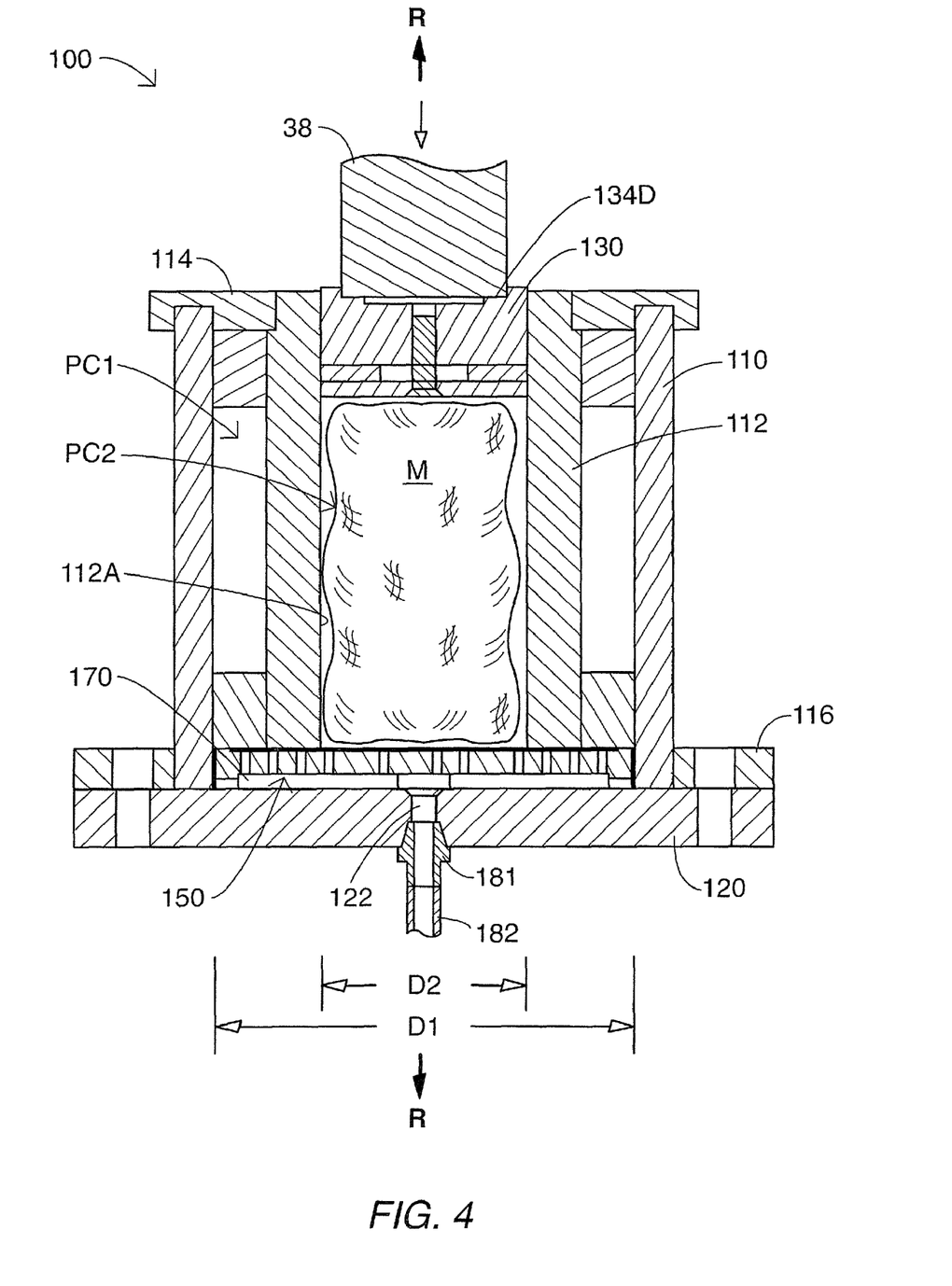
FIG. 4 is a fragmentary, cross-sectional view of the compactor system of FIG. 1 taken along the line 4-4 of FIG. 1, wherein a movable platen assembly thereof is in a ready position and a mass is disposed in the press assembly.

With reference to FIG. 1, the hydraulic drive system includes a hydraulic power unit 32 and a cylinder assembly 34. The cylinder assembly 34 is mounted in the frame 20 and connected to the hydraulic power unit 32 by hydraulic supply lines 32A, 32B. The hydraulic cylinder assembly 34 includes a base 36 and a ram 38. The hydraulic power unit 32 is operable to forcibly drive the ram 38 to an extended position (FIG. 5) and to forcibly drive or permit return of the ram 38 to a retracted position (FIGS. 1 and 4). According to some embodiments, the hydraulic drive system 30 is capable of exerting a compaction pressure or load via the ram 38 of at least 2,200 psi and, according to some embodiments, at least 10,000 psi.

The press assembly 100 is mounted in the frame 20 below the hydraulic power unit 32. The press assembly 100 can be slid in and out of the frame 20 between a compacting position (FIG. 1) and a loading/unloading position (FIG. 2). With reference to FIGS. 3 and 4, the press assembly 100 includes an outer pressure vessel 110, an inner pressure vessel or liner 112, a lid 114, a flange 116, a base plate 120, a movable platen assembly 130, and a fixed platen assembly 150.

The outer pressure vessel 110 is a cylindrical unit defining a pressure chamber PC1 having a diameter D1. The pressure vessel 110 forms the high pressure containment vessel of the press assembly 100.

The inner pressure vessel 112 is a cylindrical unit defining a pressure chamber PC2 having a diameter D2 that is less than the diameter D1. The inner pressure vessel 112 is disposed in the pressure chamber PC1. Annular spacers or rings 112B set off the inner pressure vessel 112 from the outer pressure vessel 110. The inner pressure vessel 112 has an inner surface 112A defining the pressure chamber PC2.

The pressure chambers PC1, PC2 are closed by the lid 114, the movable platen assembly 130 and the base plate 120. The flange 116 secures the outer pressure vessel 110 in position on the base plate 120. The base plate 120 is in turn slidably secured to tracks 22 of the frame 20. The base plate 120 has a drain port 122 extending fully therethrough.

The components 110, 112, 114, 116, 120 may be formed of any suitable strong and rigid material or materials capable of withstanding the applied compaction forces. According to some embodiments, these components are formed of steel.

The movable platen assembly 130 is cylindrical and is mounted to slidably, reciprocally translate along a compacting axis R-R (FIG. 4). The platen assembly 130 includes an inner platen member 132, an outer platen member 134, a seal member 136, and a bolt 138. The inner platen member 132 has a perimeter 132A, a through hole 132B, and a raised shoulder 132C. The outer platen member 134 has a perimeter 134A, a through hole 134B, a raised shoulder 134C, a concave ram recess 134D, and a concave reservoir recess 134E. The inner platen member 132 is contiguous with the pressure chamber PC2 and, in use, engages the mass M.

Figure 9:
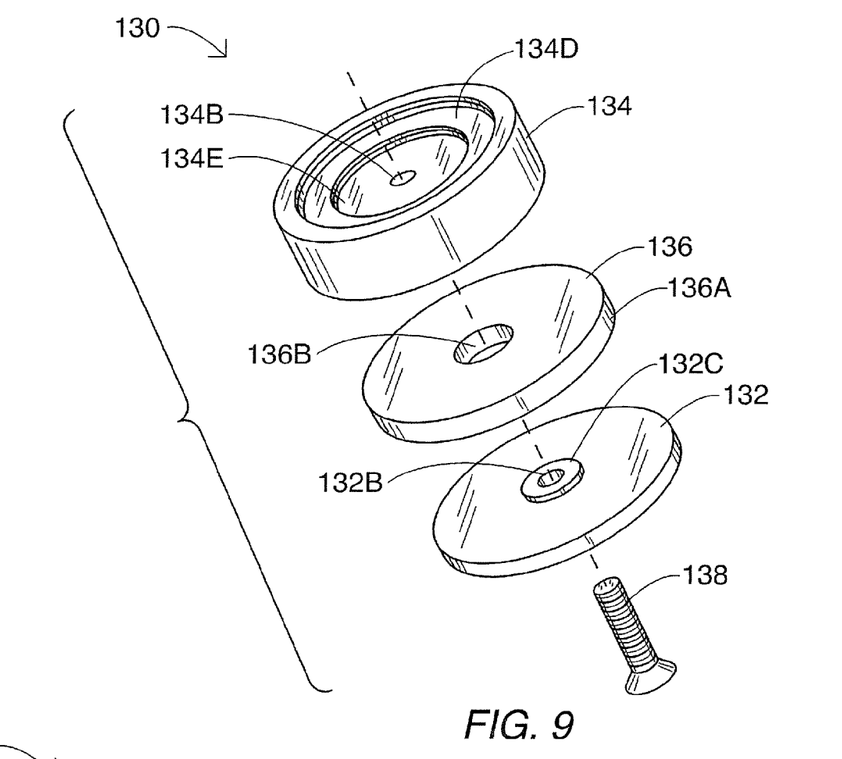
FIG. 9 is an exploded, top perspective view of the movable platen assembly.
Figure 10:
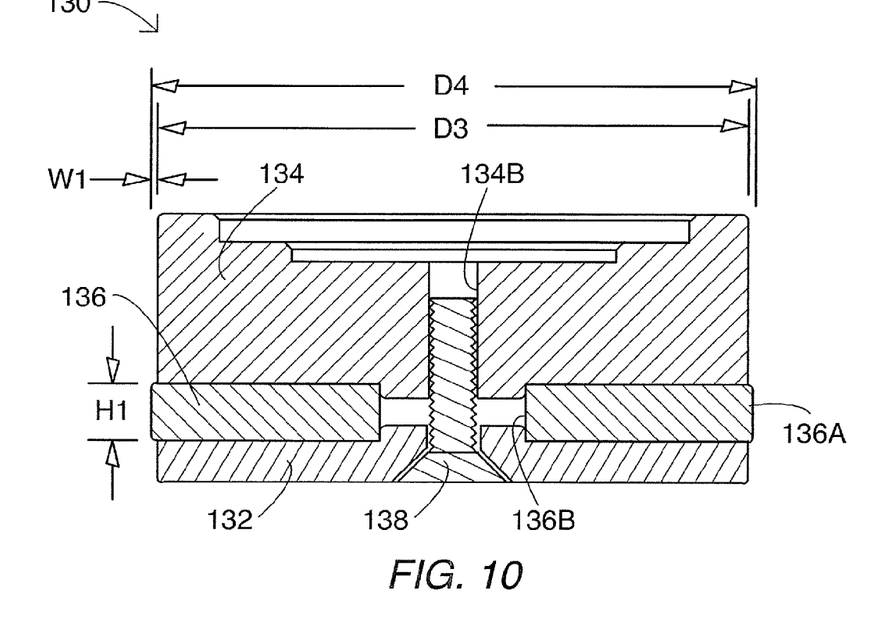
FIG. 10 is a cross-sectional view of the movable platen assembly.
Figure 11:
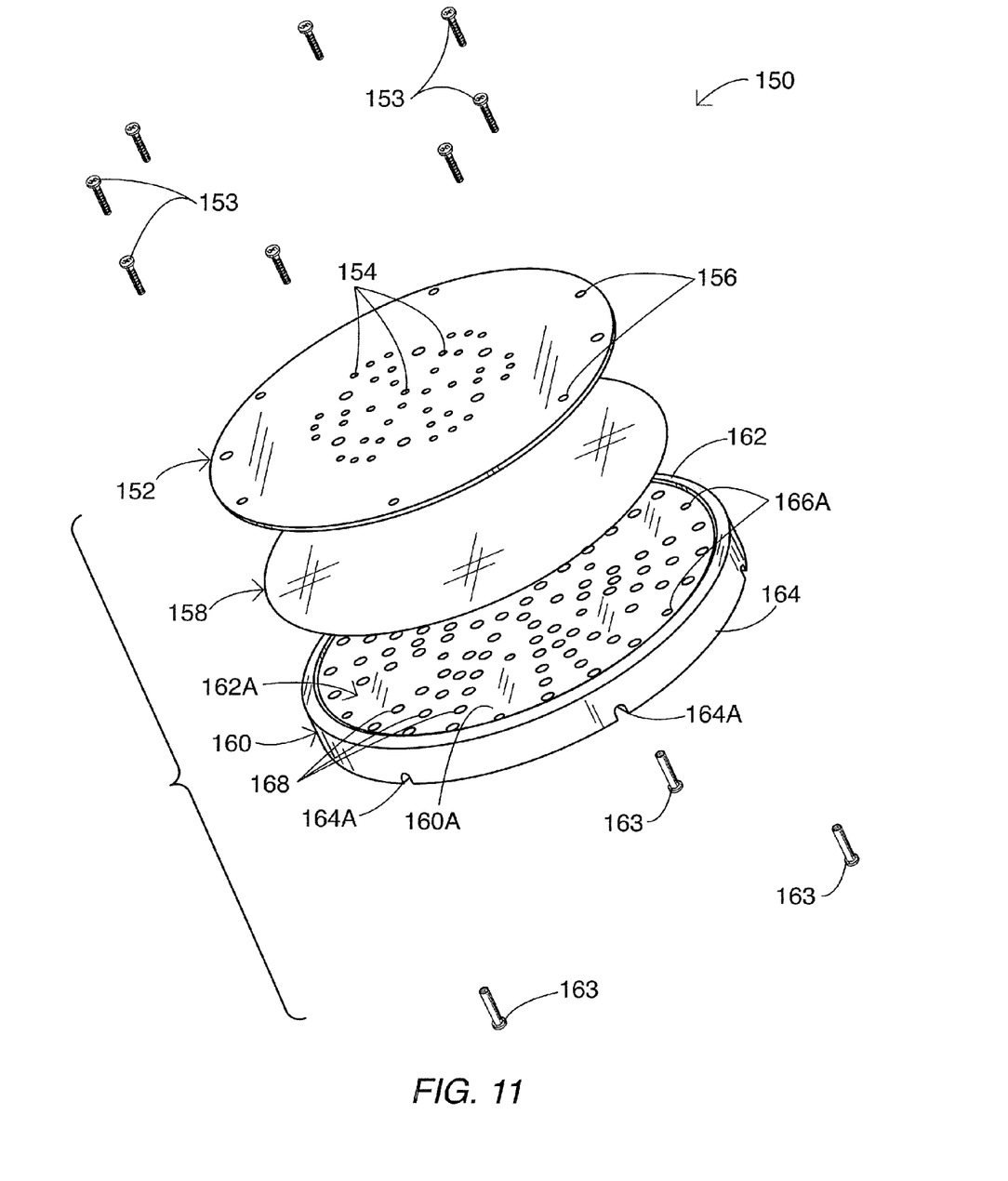
FIG. 11 is an exploded, top perspective view of the fixed platen assembly.
Figure 12:
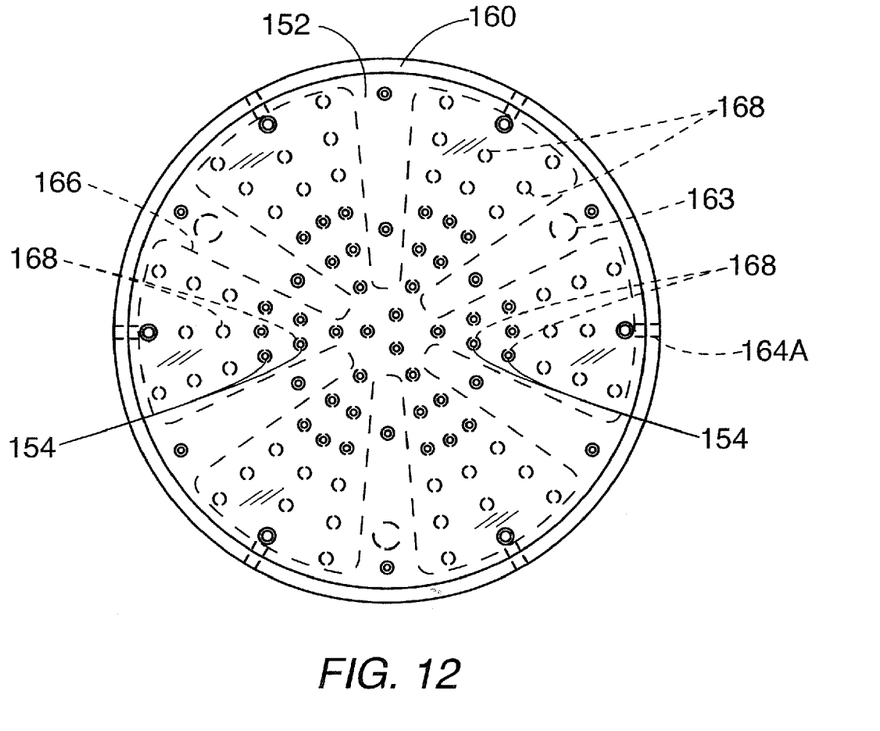
FIG. 12 is a top plan view of the fixed platen assembly.
Figure 13:
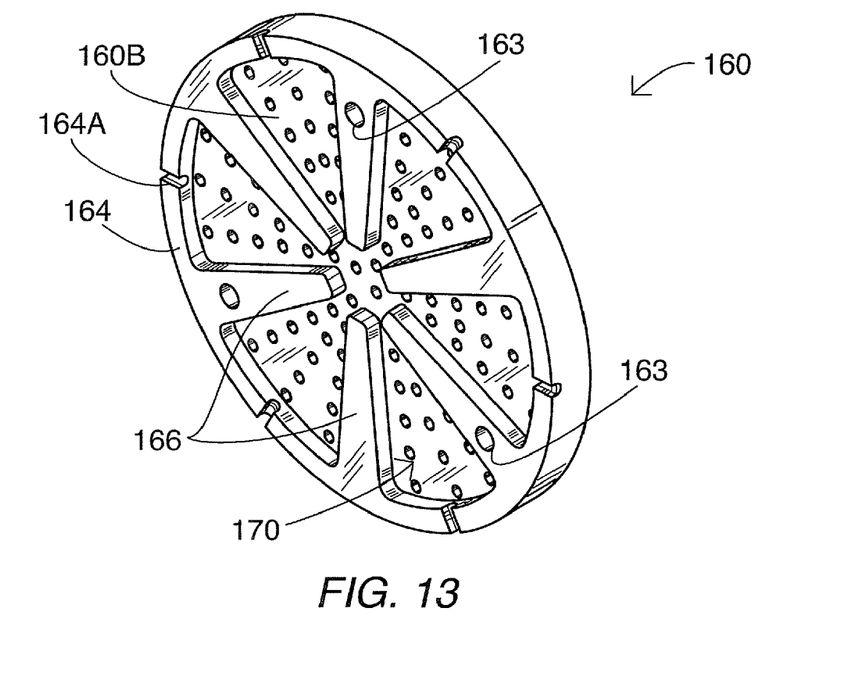
FIG. 13 is a bottom perspective view of an outer platen member forming a part of the fixed platen assembly.

With reference to FIGS. 9 and 10, the seal member 136 is interposed between the platen and members 132, 134. The raised shoulders 132C and 134C seat in a through hole 136B in the seal member 136 to relatively radially locate the platen members 132, 134 with respect to the seal member 136. The bolt 138 extends through the through holes 132B, 134B, 136B and taps into threads in the hole 132B. The bolt 138 is adapted to preload the platen members 132, 134 in compression against the seal member 136. That is, in the absence of external loading (i.e., by the hydraulic drive system 30) the seal member 136 is elastically deformed by the radial preloading applied to the seal member 136 by the bolt 138. The spacing distance H1 (FIG. 10) between the platen members 132, 134 is such that the platen members 132, 134 can be further converged without abutting one another. Compressive loading of the seal member 136 causes the diameter D4 of the perimeter 136A to bulge or expand radially outwardly beyond the diameters D3 of the platen members 132, 134. According to some embodiments, when not under load from the ram 38, the radial differential distance W1 (FIG. 10) is at least 0 inch and, according to some embodiments, is between about 0 and 0.0025 inch.

The components 132, 134, 138 may be formed of any suitable strong and rigid material or materials capable of withstanding the applied compaction forces. According to some embodiments, these components are formed of steel.

The seal member 136 may be formed of any suitable material. According to some embodiments, the seal member 136 is formed of a resilient, elastically deformable material. Suitable materials for the seal member 136 include acetal copolymer or other polymers with high compression strength and that are fatigue resistant, non- or low-moisture absorbing, intrinsically lubricious and/or approved for wash-down applications.

The fixed platen assembly 150 is affixed to the base plate 120. The fixed platen assembly 150 includes an inner plate or filter cover 152, a filter 158, and a fixed outer platen member 160. Each of the components 152, 158, 160 is cylindrical.

The filter cover 152 is contiguous with the pressure chamber PC2 and, in use, engages the mass M. The filter cover 152 has filter cover drain holes 154 extending fully therethrough. The filter cover 152 further includes bolt holes 156. The filter cover 152 may be formed of any suitable material such as steel. Attributes such as the sizes and configuration of the drain holes 154 may depend on the desired performance characteristics.

The fixed platen member 160 has an inner side 160A and an outer side 160B. The outer platen member 160 has an annular flange 162 defining an inner recess 162A. The platen member 160 also has an outer annular flange 164 that, in combination with the base plate 120, defines a sump 170. Radial slots 164A are defined in the flange 164. A plurality of spaced apart support ribs 166 extend along the outer surface 160B. Bolt bores 166A are formed in the support ribs 166. Drain holes 168 extend fully through the outer platen member 160 to provide fluid communication between the sides 160A, 160B. The outer platen member 160 may be formed of any suitable material such as steel. Attributes such as the sizes and configuration of the drain holes 168 may depend on the desired performance characteristics.

The filter 158 is interposed between the filter cover 152 and the outer platen member 160. The filter cover 152 and the filter 158 are seated in the recess 162A. The filter 158 may be formed of any suitable porous material. According to some embodiments, the filter 158 is formed of a porous material having a fibrous mesh composition. Attributes of the filter 158 such as the material, mesh size, and/or wire diameter or thickness may depend on the desired performance characteristics.

The filter cover 152 is secured to the outer platen member 160 by bolts 153. The platen member 160 is in turn secured to the base plate 120 by bolts 163.

The fluid management system 180 includes a drain conduit or piping 182, a fluid manifold 184, a reservoir or collection station 186, a pressurized ejection or displacement fluid supply 187 station, and a cleaning fluid supply station 188. The drain conduit 182 is fluidly connected to the drain port 122 of the base plate 120 by a suitable fitting 181. The manifold 184 is in turn connected to the stations 186, 187, 188 by piping or conduits 186A, 187A, 188A, respectively. Valves 186B, 187B, 188B are provided in the conduits 186A, 187A, 188A to selectively control fluid flow through the drain conduit 182 and the drain port 122. Fluid (gas or liquid) can flow downstream (i.e., from the drain port 122 to the stations 186, 187, 188) or upstream (i.e., from the stations 186, 187, 188 to the drain port 122) through the conduits 186A, 187A, 188A and the manifold 184. The components 187, 187A 187B and the components 188, 188A, 188B may be referred to as an influent system in that they can be used to selectively inject fluids (i.e., influent fluids) into the pressure chamber PC2, as discussed in more detail herein.

The collection station 186 may be a suitable collection site such as a tank, basin or the like. Alternatively, the conduit 186A can drain to the environment without a collection container. The collection station 186 should be sized and formed of a material suitable to receive the liquid L from the mass M. The collection station 186 may be gravity fed and/or may include a pump or vacuum to assist in directing the liquid L to the collection station 186 from the drain port 122.

The displacement fluid supply station 187 may be any suitable supply or generator of positively pressurized fluid such as air. According to some embodiments, the displacement fluid supply station 187 includes a container of compressed gas. According to some embodiments, the displacement fluid supply station 187 includes a pump or fan.

The cleaning fluid supply station 188 includes a supply of any suitable cleaning or rinsing fluid. According to some embodiments, the cleaning fluid includes a liquid. According to some embodiments, the cleaning fluid includes a solution of a cleaning chemical and a solvent such as water. Suitable cleaning fluids may include steam and/or commercially available detergents and solvents.

Operation of the compactor system 10 and methods according to embodiments of the present invention will now be described. Initially, the valve 186B is opened and the valves 187B, 188B are closed. With the ram 38 retracted, the press assembly 100 is moved to the load/unload position of FIG. 2. A feedstock mass M is loaded into the pressure chamber PC2 through the opening 114A in the lid 114. The press assembly 100 is returned to the compacting position of FIG. 1. The ram 38 is seated in or adjacent the recess 134D in the movable platen assembly 130 as shown in FIG. 4.

Figure 5:
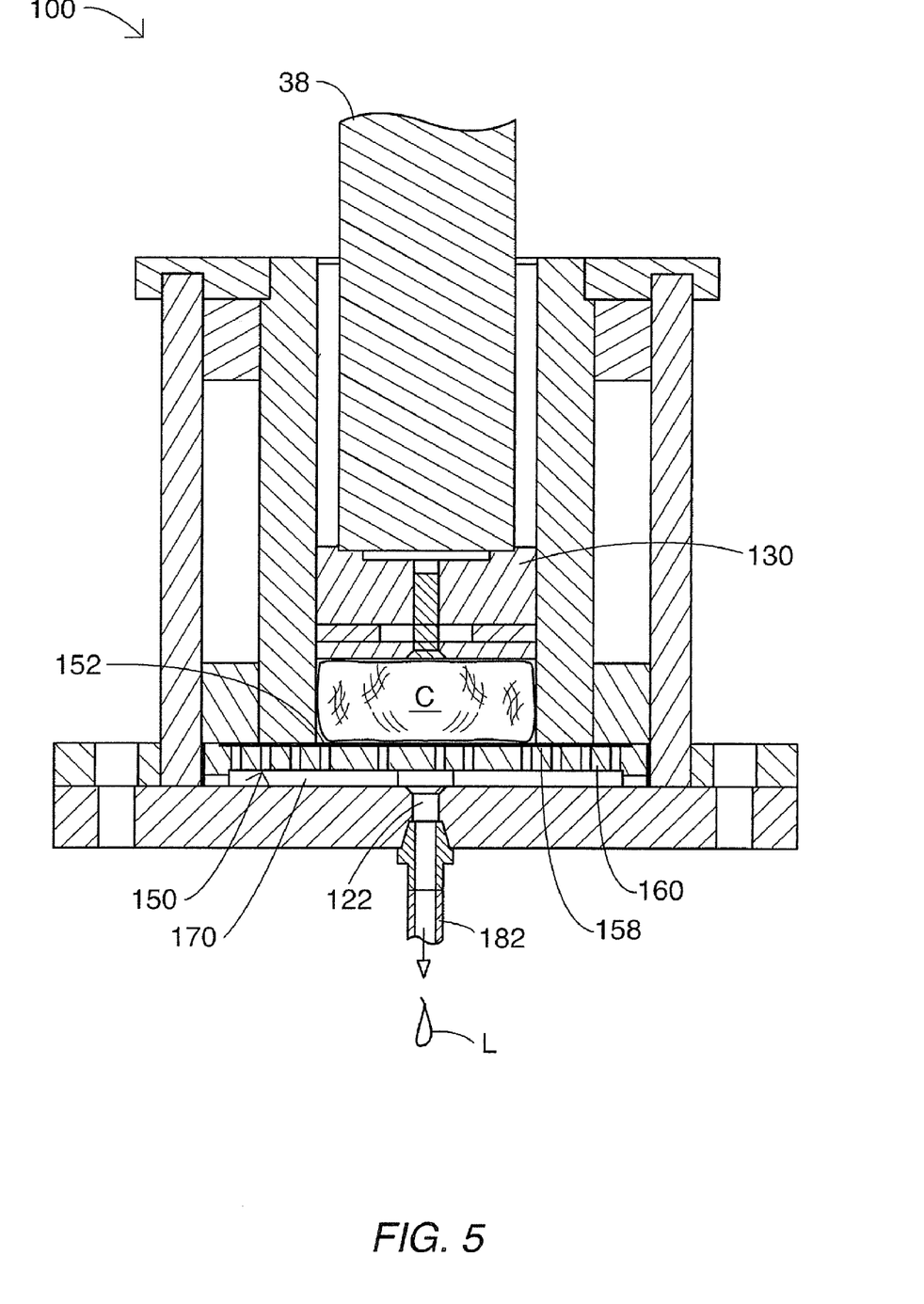
FIG. 5 is a fragmentary, cross-sectional view of the compactor system of FIG. 1 wherein the movable platen assembly is in a compacting position.
Figure 6:
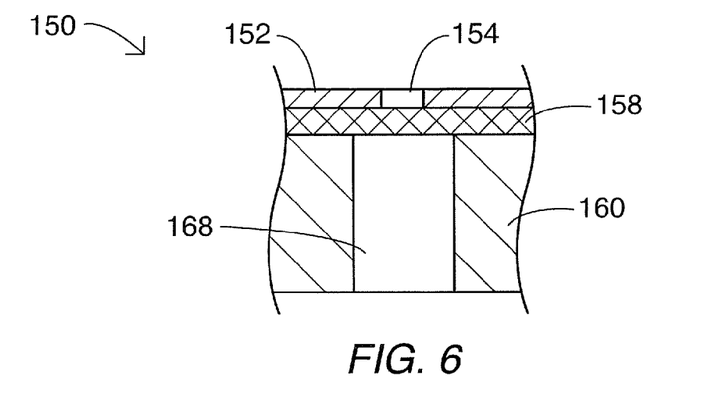
FIG. 6 is an enlarged, fragmentary, cross-sectional view of a fixed platen assembly of the press assembly of FIG. 1.

The hydraulic power unit 32 is actuated to drive the ram 38 toward the fixed platen assembly 150 as indicated by the arrow in FIG. 4. In this manner, the movable platen assembly 130 is forcibly driven toward the fixed platen assembly 150 to automatically compress the mass M as shown in FIG. 5. In doing so, the compactor system 10 automatically compresses the solid components of the mass M and thereby removes the liquid L from the solids. In the case of a mass M containing water, this removal may be referred to as dewatering. The solids may ultimately be compressed into a cake C as shown in FIG. 5.

The liquid L flows through the drain holes 154, the filter 158, and the drain holes 168, into the sump 170, through the drain conduit 182, through the manifold 184, through the conduit 186A, and into the reservoir 186 where the liquid L is collected. The sump 170 provides a local, temporary fluid collection space and is configured to allow for non-uniform flow of the liquid L from the mass M and prevent backflow of the removed liquid L into the cake C. The radial slots 164A allow liquid that has bypassed the fixed platen assembly 150 to drain into the sump 170. The liquid L that bypasses the movable platen assembly 130 may be captured in the reservoir 134E.

The compactor system 10 can provide and enable high pressure for compaction while nonetheless effectively containing the solids of the mass M. The hydraulic drive system 30 in particular can provide relatively high compaction force (e.g., on the order of 10,000 psi or more). The pressure vessel 112, the movable platen assembly 130, and the fixed platen assembly 150 together constitute a pressure boundary about the pressure chamber PC2 that can withstand the compaction loading and inhibit or prevent unwanted bypass/migration of liquid and/or solids, while still transferring the compaction loading to the mass M and permitting removed liquid to drain.

It will be appreciated that in order to transfer the compaction force to the mass M, the movable platen assembly 130 must be moved with respect to the pressure vessel 112. Such relative movement may ordinarily permit escape of the mass M around the movable platen assembly 130 between the movable platen assembly 130 and the pressure vessel 112. Upon retraction of the platen assembly 130, liquid L that bypasses the platen assembly 130 may rehydrate the cake C. Also, such escape of the liquid L may present safety issues. However, in accordance with embodiments of the present invention, the platen assembly 130 is adapted to seal the annulus between the platen members 132, 136 and the adjacent inner surface 112A of the pressure vessel 112. The configuration of the platen assembly 130 and the rigid plates 132, 134 can withstand the applied loads and resist upset conditions such as misalignment and non-uniform loading. On the other hand, the seal member 136 extends laterally beyond the platen member perimeters 132A, 134A to engage the pressure vessel surface 112A to form a seal therebetween. The seal member 136 thereby provides a translatable fluid barrier seal between the platen members 132, 134 and the pressure vessel 112. According to some embodiments, the seal member 136 is laterally positively loaded against the surface 112A (i.e., the seal member 136 exerts a load on the surface 112A in a plane orthogonal to the compacting axis R-R).

The seal member 136 should have sufficient compression strength to withstand the intended compaction pressures without crushing or undergoing permanent deformation. As discussed above, according to some embodiments, the seal member 136 is preloaded by the bolt 138 such that the seal member 136 laterally bulges or expands radially outwardly. According to some embodiments, as additional compressive loading is applied to the seal member 136 by the ram 138, the seal member 136 is further axially compressed and as a result laterally expands and/or exerts additional outwardly laterally (i.e., radially) directed force against the surface 112A. In this way, the seal pressure exerted by the seal member 136 may be automatically and inherently scaled in accordance with the compaction pressure.

According to some embodiments, the seal member 136 is formed of a material having intrinsic lubricity with respect to the surface 112A so that external lubricant is not required. Such external lubricant may contaminate the mass M. More generally, the seal member 136 should be compatible with the mass M to reduce or prevent degradation of performance and contamination issues.

The fixed platen assembly 150 also serves conflicting functions or performance goals. Namely, the fixed platen assembly 150 provides the reaction to the compaction force applied by the movable platen assembly 130 (i.e., the cake C is cooperatively pressed between the platen assemblies 130 and 150). The platen assembly 150 therefore must maintain, at least in substantial part, the high pressure boundary with respect to the solids of the mass M. The fixed platen assembly 150 must also permit the removed liquid L to drain therethrough. It is also desirable for the fixed platen assembly 150 to perform these functions reliably and effectively without premature clogging of the drain paths.

The construction of the fixed platen assembly 150 enables it to maintain sufficient structural strength to withstand the press operating pressure. The support ribs 166 of the outer platen member 160 serve to transmit the compaction forces to the base plate 122 to thereby inhibit deformation of the outer platen member 160.

The drain holes 154, 168 provide drainage paths or conduits for the removed liquid. The uniformly distributed, sectorized patterning of the drain holes 154, 168 between the circumferentially spaced apart ribs 166 can provide sufficient drainage area while still maintaining the structural integrity of the fixed platen assembly 150 in service. According to some embodiments, the drain holes 154, 168 have mutually parallel axes. According to some embodiments, at least some of the drain holes 154 are concentric with respective ones of the drain holes 168. According to some embodiments, the drain holes 154 and the drain holes 168 have different hole patterns from one another. According to some embodiments, there are more drain holes 168 than drain holes 154.

According to some embodiments, the sizes and configurations of the drain holes 154, 168 and the characteristics of the filter 158 can be selected as appropriate for the characteristics of the mass M. According to some embodiments, the sizes of the drain holes 154 are determined based on the solid particles/fiber size distribution of the mass M. According to some embodiments, the configuration and number of the drain holes 154 are determined based on the fluid content of the mass M. The mesh attributes of the filter 158 can be determined by the particle size distribution, liquid content, chemical nature of the removed liquid, and the press operating pressure. The filter mesh may be characterized by a selective combination of mesh size, wire size, percent open area and material. The filter mesh must permit fluid filtration and drainage while resisting the press operating pressure. According to some embodiments, the mesh is selected to resist yielding, shearing and clogging by the pressurized cake C when subjected to multiple compaction cycles.

The filter cover 150, filter 158 and outer platen member 160 used in combination as described herein can provide particularly effective and reliable solids containment and removed liquid drainage. The filter cover drain holes 154 limit the force of the mass M solids against the filter 158 while the drain holes 168 of the outer platen member 160 permit increased fluid flow through the filter 158.

The bolts 163 permit the fixed platen assembly 150 to be removed from the base plate 120 for periodic cleaning and replacement. The bolts 153 permit the filter cover 152 and the filter 158 to be removed from the outer platen member 160 for periodic cleaning or replacement.

According to some embodiments, the filter cover 152 and the filter 158 are removed from the outer platen member 160 and one or both are replaced to selectively alter the performance characteristics of the fixed platen assembly 150. For example, when a new type of mass M is to be compacted, the filter 158 can be replaced with a filter having a different mesh size or the like as deemed better suited for the new mass M. According to some embodiments, the filter covers 152 and the filters 158 may be preselected or matched for interchangeable use depending on the drainage and containment characteristics required or desired.

Figure 7:
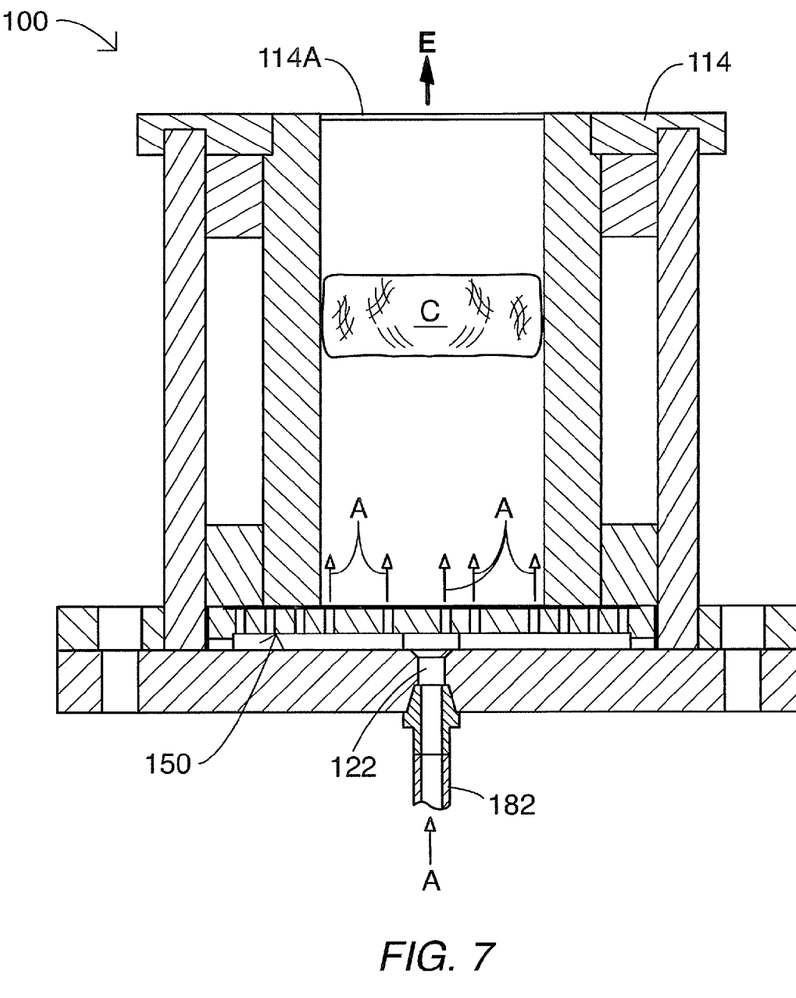
FIG. 7 is a fragmentary, cross-sectional view of the compactor system of FIG. 1 taken along the line 4-4 of FIG. 1, wherein a flow of displacement fluid is lofting a cake.

After the cake C has been formed as discussed above, the fluid management system 180 can be used to dislodge and partially or fully eject the cake C from the pressure chamber PC2. With reference to FIGS. 1 and 7, the movable platen assembly 130 is removed, the valve 186B is closed and the valve 187B is opened. A pressurized flow of the displacement fluid A (e.g., pressurized air) is provided from the displacement fluid supply station 187. The flow A flows upstream from the displacement fluid supply station 187, through the conduit 187A, through the drain conduit 182, through the fitting 181, through the drain port 122, through the sump 170, through the outer platen member 160, through the filter 158, through the filter cover 152, and into the pressure chamber PC1 as shown in FIG. 7. In this manner, the displacement fluid is forcibly injected into the pressure vessel PC2 through the drain port 122. The force of the flow A applies pressure to the underside of the cake C and displaces the cake C in an ejection direction E. According to some embodiments, the flow A serves to displace or eject the cake C fully out of the pressure vessel 112 through the top opening 114A. A suitable mechanism may be provided to capture and convey the cake C for further processing.

The fixed platen assembly 150 and the sump 170 may serve to laterally distribute the displacement fluid flow A so that the flow A more uniformly impinges the underside of the cake C. In this manner, the fixed platen assembly 150 and the sump 170 may reduce the risk of damage to the cake C.

Figure 8:
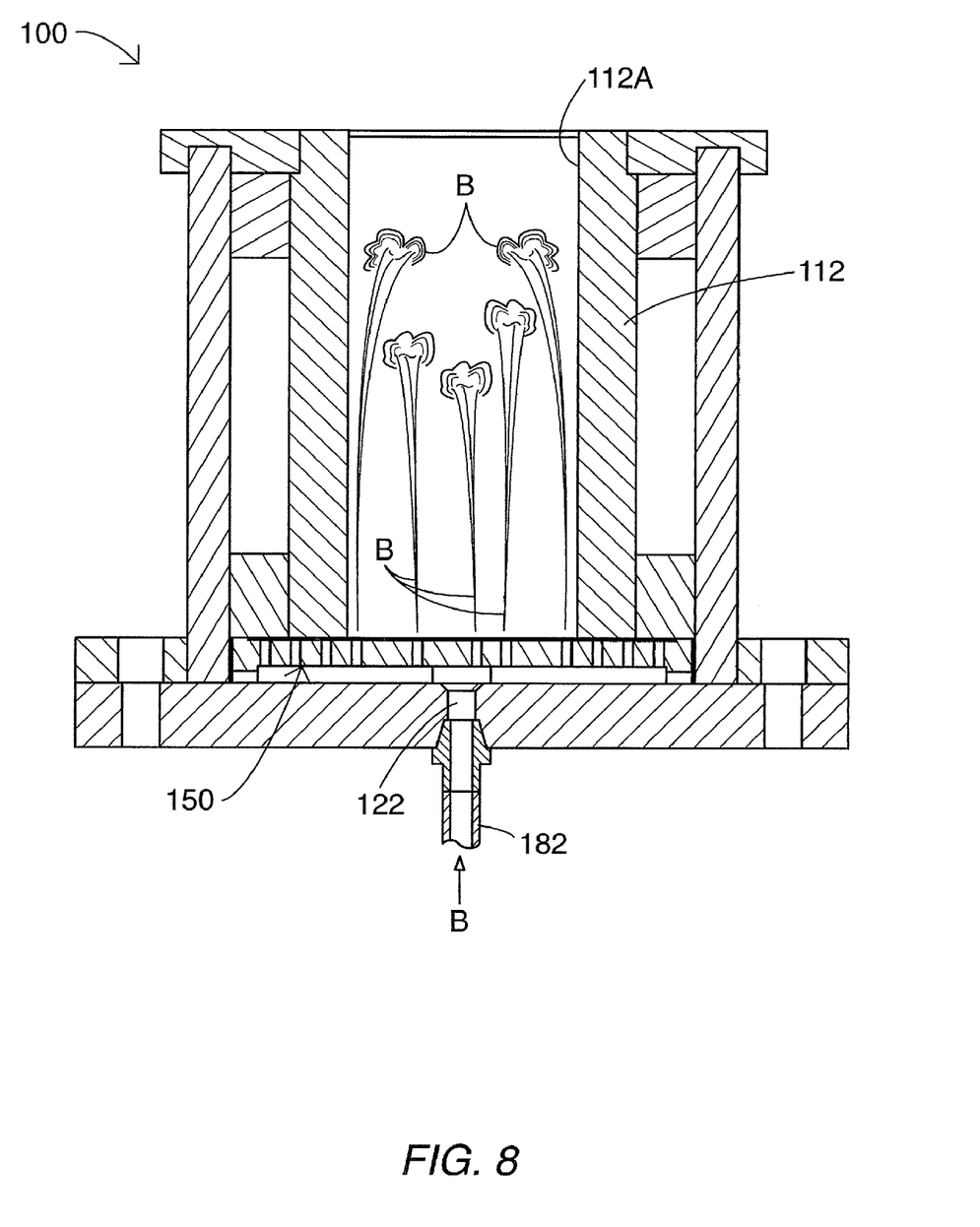
FIG. 8 is a fragmentary, cross-sectional view of the compactor system of FIG. 1 taken along the line 4-4 of FIG. 1, wherein a flow of cleaning fluid is being injected into the pressure chamber.

The fluid management system 180 may also be used to periodically clean the press assembly 100. With reference to FIGS. 1 and 8, after the cake C has been removed, the valve 187B is closed and the valve 188B is opened. A pressurized flow of the cleaning fluid B is provided from the cleaning fluid supply station 188. The flow B flows upstream from the cleaning fluid supply station 188, through the conduit 187A, through the drain conduit 182, through the fitting 181, through the drain port 122, through the sump 170, through the outer platen member 160, through the filter 158, through the filter cover 152, and into the pressure chamber PC2 as shown in FIG. 8. In this manner, the cleaning fluid is forcibly injected into the pressure vessel 112 through the drain port 122. The pressurized cleaning fluid flow B may serve to backflush the drain holes 154, 168 and the filter 158 to dislodge residual mass M solids therefrom. The flow B may further deposit on and/or traverse the inner surface 112A to clean the surface 112A. The cleaning procedure may include multiple steps and use multiple different cleaning fluid supplies (not shown), each of which is supplied via the drain port 122 and may have its own piping and control valve. The displacement fluid supply station 187 may be used as part of the cleaning procedure to purge and/or dry the fixed platen assembly 150 and the pressure vessel 112, for example.

Figure 14:
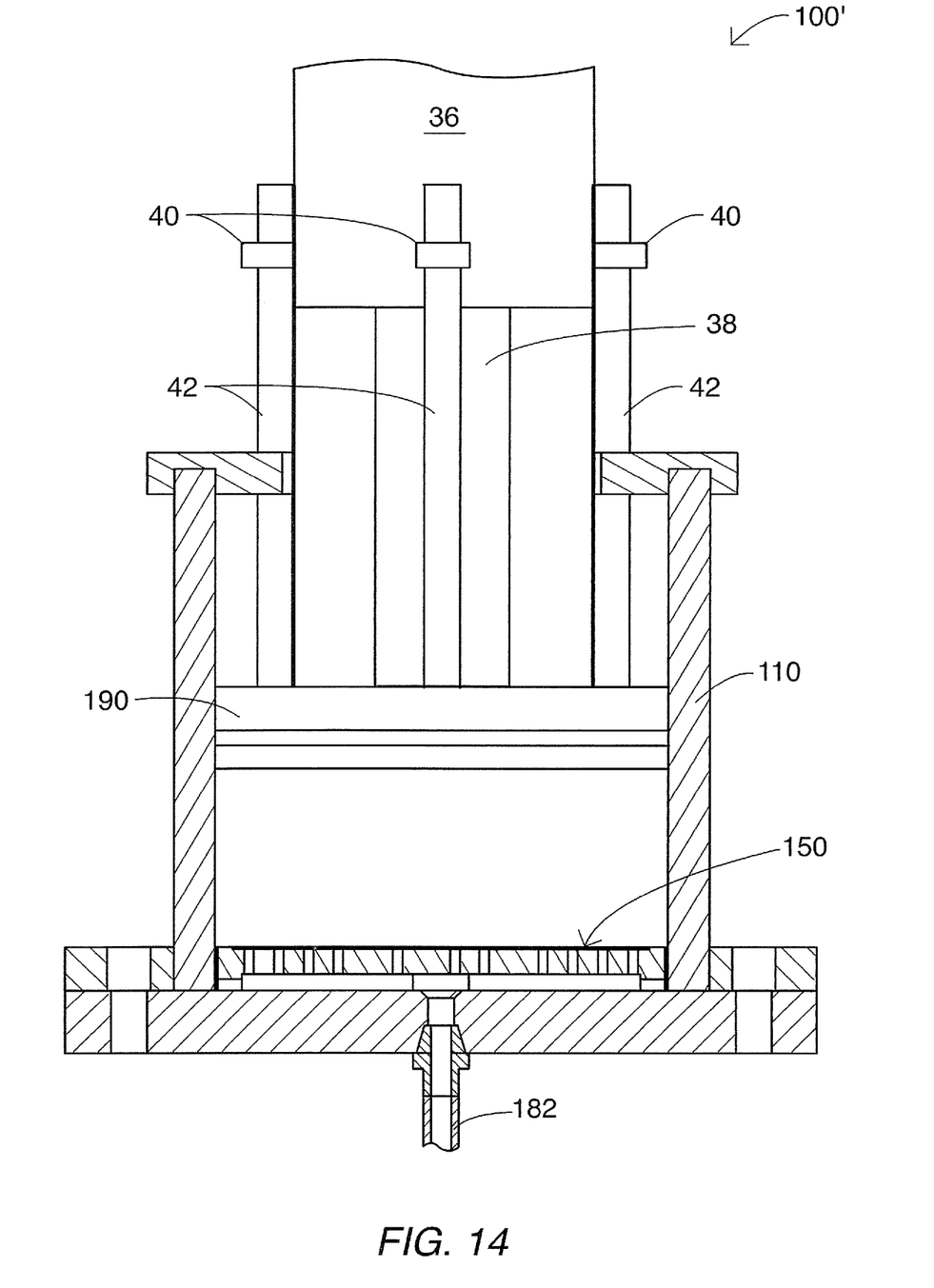
FIG. 14 is a fragmentary, cross-sectional view of the compactor system of FIG. 1 in a modified configuration.

With reference to FIG. 14, the press assembly 100 may be reconfigured to a press assembly 100' to accommodate a larger amount of mass M. For example, the configuration of FIGS. 3 and 4 may be employed for compacting with a relatively higher compaction load and the configuration of FIG. 14 may be used for compacting with a relatively lower compaction load. Referring to FIG. 14, the press assembly 100 is converted to the press assembly 100' by removing the pressure vessel 112 and replacing the movable platen assembly 130 with an enlarged movable platen assembly 190. The movable platen assembly 190 corresponds to the movable platen assembly 130 except that the diameter of the platen assembly 190 is sized to cooperate with the inner surface of the pressure vessel 110 to form a movable seal. Guide rods 42 may be slidably mounted in guide bearings 40 and extend to the movable platen assembly 190 to resist misalignment or cocking of the movable platen assembly 190 in the case of uneven loading, for example. The press assembly 100' may otherwise operate in the same manner as described above for the press assembly 100.

The systems and methods as described here may be used to compact and remove liquid from any suitable type of mass M. According to some embodiments, the mass M is a biomass. Exemplary biomasses include sugarcane, switchgrass, corn and hemp.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A compactor system for compressing a mass including liquid and solids, the compactor system comprising:
   - a pressure vessel defining a pressure chamber to hold the mass;
   - a compaction mechanism to compress the mass in the pressure chamber to remove the liquid from the solids;
   - a drain port communicating with the pressure chamber and through which the removed liquid drains out of the pressure chamber;
   - drain piping fluidly connected to the drain port to direct the removed liquid to a collection site;
   - an influent system configured to inject an influent fluid into the pressure chamber through the drain port; and
   - a platen disposed in the pressure chamber having platen holes defined therein, wherein the compactor is configured such that the removed liquid drains through the platen holes before draining through the drain port, and the influent fluid flows through the platen holes after flowing through the drain port.

2. The compactor system of claim 1 wherein the influent fluid is a cleaning liquid.

3. The compactor system of claim 1 wherein the influent fluid is a displacement fluid and the influent system is configured to inject a pressurized flow of the displacement fluid into the pressure chamber through the drain port.

4. The compactor system of claim 3 wherein the displacement fluid is pressurized air.

5. The compactor system of claim 3 wherein the influent system is configured to selectively inject a second influent fluid into the pressure chamber through the drain port, wherein the second influent fluid is a cleaning liquid.

6. The compactor system of claim 1 wherein the influent system is connected to the drain port by the drain piping, and further including at least one valve mechanism to enable a user to control injection of the influent fluid through the drain port.

7. The compactor system of claim 1 wherein the platen includes a filtration system including:

an inner platen member contiguous with the pressure chamber to engage the mass during compaction, the inner platen member having a plurality of inner drain holes defined therein;

an outer platen member opposite the inner platen member from the pressure chamber, the outer platen member having a plurality of outer drain holes defined therein; and a filter member interposed between the inner platen member and the outer platen member;

wherein the inner platen member, the outer platen member and the filter member maintain a high pressure boundary with respect to the compressed mass while permitting the liquid removed from the mass to drain through the inner drain holes, the outer drain holes and the filter member.

8. The compactor system of claim 1 wherein the platen defines a sump between the platen and the drain port to temporarily receive the removed liquid before the removed liquid flows out through the drain port.

9. The compactor system of claim 1 wherein the compaction mechanism includes a self-sealing, movable platen assembly comprising:

an inner platen member contiguous with the pressure chamber to engage the mass during compaction;

an outer platen member opposite the inner platen member from the pressure chamber; and a seal member interposed between the inner platen member and the outer platen member, wherein the seal member extends radially outwardly beyond the inner and outer platen members to form a translatable fluid barrier seal between the movable platen assembly and the pressure vessel.

10. The compactor system of claim 7 wherein at least one of the inner and outer platen members is removable to permit removal and replacement of the filter member.

11. The compactor system of claim 10 wherein the inner platen member is removable to permit removal and replacement of the filter member.

12. The compactor system of claim 11 wherein the outer platen member is fixed with respect to the pressure vessel.

13. The compactor system of claim 11 including a plurality of selectively interchangeable inner platen members each having different patterns of drain holes.

14. The compactor system of claim 7 wherein the outer platen member defines a sump opposite the filter member to receive the removed liquid.

15. The compactor system of claim 9 wherein the movable platen assembly is configured to permit relative convergent displacement between the inner and outer platen members to apply a compressive load to the seal member, responsive to which the seal member exerts an increased radial outward sealing force against the pressure vessel.

16. The compactor system of claim 1 wherein the compaction mechanism is operative to form the solids of the mass remaining after removal of the liquid into a cake, and the compactor system further includes an ejection system configured to inject a pressurized flow of a displacement fluid into the pressure chamber to forcibly displace the cake with respect to the pressure vessel.

17. A compactor system for compressing a mass including liquid and solids, the compactor system comprising:

a pressure vessel defining a pressure chamber to hold the mass;

a compaction mechanism to compress the mass in the pressure chamber to remove the liquid from the solids, wherein the compaction mechanism includes a self-sealing, movable platen assembly comprising:

an inner platen member contiguous with the pressure chamber to engage the mass during compaction;

an outer platen member opposite the inner platen member from the pressure chamber; and a seal member interposed between the inner platen member and the outer platen member, wherein the seal member extends radially outwardly beyond the inner and outer platen members to form a translatable fluid barrier seal between the movable platen assembly and the pressure vessel;

a drain port communicating with the pressure chamber and through which the removed liquid drains out of the pressure chamber;

drain piping fluidly connected to the drain port to direct the removed liquid to a collection site; and an influent system configured to inject an influent fluid into the pressure chamber through the drain port;

wherein the movable platen assembly is configured to permit relative convergent displacement between the inner and outer platen members to apply a compressive load to the seal member, responsive to which the seal member exerts an increased radial outward sealing force against the pressure vessel.

18. The compactor system of claim 17 wherein the influent fluid is a cleaning liquid.

19. The compactor system of claim 17 wherein the influent fluid is a displacement fluid and the influent system is configured to inject a pressurized flow of the displacement fluid into the pressure chamber through the drain port.

20. The compactor system of claim 17 wherein the influent system is connected to the drain port by the drain piping, and further including at least one valve mechanism to enable a user to control injection of the influent fluid through the drain port.

21. The compactor system of claim 17 wherein at least one of the inner and outer platen members is removable to permit removal and replacement of the filter member.

22. The compactor system of claim 21 wherein the inner platen member is removable to permit removal and replacement of the filter member.

23. The compactor system of claim 22 wherein the outer platen member is fixed with respect to the pressure vessel.

24. The compactor system of claim 22 including a plurality of selectively interchangeable inner platen members each having different patterns of drain holes.

25. The compactor system of claim 17 wherein the outer platen member defines a sump opposite the filter member to receive the removed liquid.

26. The compactor system of claim 17 wherein the compaction mechanism is operative to form the solids of the mass remaining after removal of the liquid into a cake, and the compactor system further includes an ejection system configured to inject a pressurized flow of a displacement fluid into the pressure chamber to forcibly displace the cake with respect to the pressure vessel.

* * * * *

UNITED STATES PATENT AND TRADEMARK OFFICE
CERTIFICATE OF CORRECTION

PATENT NO. : 7,954,426 B2  Page 1 of 1
APPLICATION NO. : 12/128832
DATED : June 7, 2011
INVENTOR(S) : Murphy et al.

It is certified that error appears in the above-identified patent and that said Letters Patent is hereby corrected as shown below:

On the Drawings:
Sheet 10 of 11, Figure 12: replace FIGS. 12 and 13 on Drawing Sheet 10 with the following:

FIG. 12

FIG. 13

Signed and Sealed this
Fourteenth Day of August, 2012

David J. Kappos
*Director of the United States Patent and Trademark Office*